O. L. PLETTNER AND W. H. LOWE.
TRACTOR PLOW.
APPLICATION FILED APR. 10, 1919.
1,378,196.
Patented May 17, 1921.
2 SHEETS—SHEET 1.
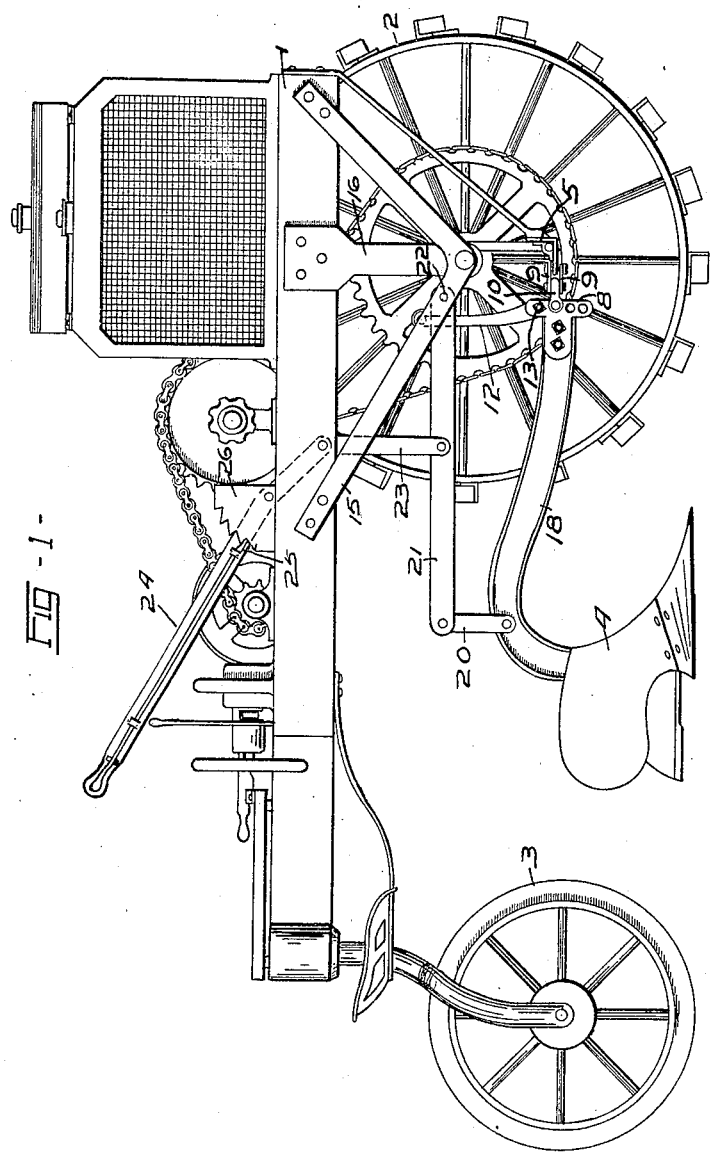
INVENTORS
Otto L. Plettner
William H. Lowe
by
Owen, Owen & Crampton O. L. PLETTNER AND W. H. LOWE.
TRACTOR PLOW.
APPLICATION FILED APR. 10, 1919.
1,378,196.
Patented May 17, 1921.
2 SHEETS—SHEET 2.
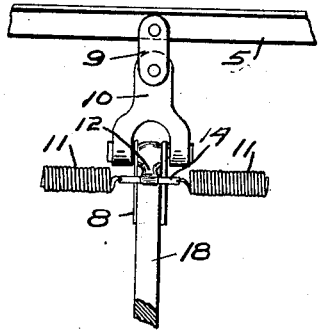
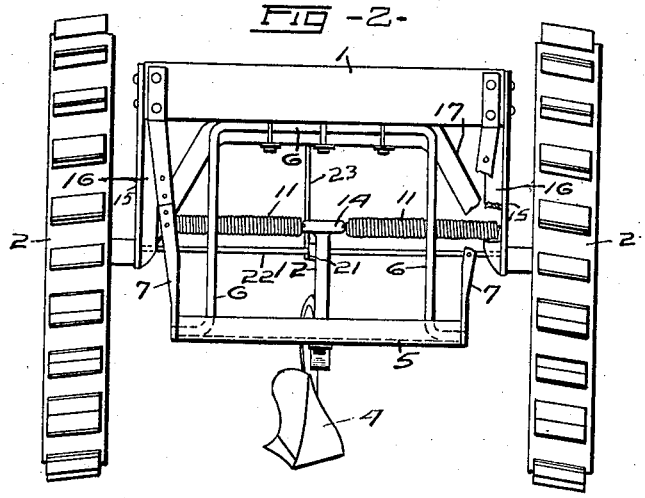
- INVENTORS -
Otto L. Plettner
William H. Lowe
by
Owen, Owen & Crampton

UNITED STATES PATENT OFFICE.

OTTO L. PLETTNER AND WILLIAM H. LOWE, OF CONTINENTAL, OHIO, ASSIGNORS TO THE CONTINENTAL TRACTOR COMPANY, OF CONTINENTAL, OHIO, A CORPORATION OF OHIO.

TRACTOR-PLOW.

1,378,196.  Specification of Letters Patent.  Patented May 17, 1921.

Application filed April 10, 1919. Serial No. 289,156.

*To all whom it may concern:*

Be it known that we, OTTO L. PLETTNER and WILLIAM H. LOWE, citizens of the United States, and residents of Continental, in the county of Putnam and State of Ohio, have invented a certain new and useful Tractor-Plow; and we do hereby declare the following to be a full, clear, and exact description of the invention, such as will enable others skilled in the art to which it appertains to make and use the same, reference being had to the accompanying drawings, and to the characters of reference marked thereon, which form a part of this specification.

Our invention has for its object to provide particularly a means for readily controlling the ordinary plow when attached to a tractor so as to guide the plow and yet permit the plow to overcome or slip by obstacles that the plow may meet with while cutting the furrow. It also has for its object to provide a means whereby the plow may be readily removed from the furrow during the operation of the tractor and in this connection to provide a means for readily adjusting the angle of the plow with reference to the surface of the ground operated upon.

The invention may be contained in tractors and agricultural implements of different forms. We have selected one form of construction containing the invention as an illustration of such constructions and shall describe it hereinafter. The construction selected is illustrated in the accompanying drawings.

Figure 1 of the drawings is a side view of the tractor and a plow connected thereto. Fig. 2 is a front end view of the tractor and the plow. Fig. 3 is a top view of the beam or clevis of the plow.

1, in the drawings, is the frame of the tractor which is provided with the driving wheels 2 and the guide wheel 3. 4 is the plow which is connected to the tractor, through a cross bar 5 which is attached to an inverted U-bar 6. The inverted U-bar is also connected to tension members or straps 7 that are secured to the end of the frame 1. The cross bar 5 may be an L-bar. It is connected to the clevis 8 of the plow by means of the links 9 and stirrup 10. The links 9 and the stirrup 10 allow a certain latitude of swing of the beam of the plow to permit the plow to move by or over obstacles that it meets with while forming the furrow. The beam, however, is yieldingly held in normal position and so as to yieldingly overcome any misdirection of the plow by means of the springs 11 which are connected to a guide bar 12 which is connected to the clevis 8 by means of the bolt 13 and extends upward from the beam of the plow to a point of considerable height with reference to the beam of the plow. The upper end of the plow 12 is provided with a cross-piece or head 14 to which are connected the springs 11. The springs 11 are connected by suitable means to angular bars 15 that connect to a depending bracket 16. The angle bar 15 and the brackets 16 are connected to the frame and operate to strengthen the inverted U-bar 17 to which the bull wheels 2 are rotatably connected. Any lateral or vertical movement of the end of the beam 18 of the plow is yieldingly resisted through the bar 12 by means of the springs 11 which yieldingly tend to keep the plow in proper alinement and adjustment to permit the plow to avoid the obstacles that it may meet with in the formation of the furrow.

The plow beam, at a point substantially in vertical line with its center of gravity, is supported by a link 20 which is connected to a lever 21. The lever 21 is fulcrumed on a cross rod 22 that is supported in the angle bars 15. The lever 21, which is of the third class of levers, is connected by a link 23 to a lever 24 which may be provided with a dog 25 that engages a ratchet 26. Upward movement of the lever 24 operates to lower the plow while downward movement of the lever 24 operates to lift the plow. By this arrangement the plow may be raised or lowered either to overcome obstacles or to guide the plow with reference to the ground and the furrow that may be formed. The link and lever connections 23 and 21 with the plow also permits lateral and vertical movements of the plow in order that the plow may pass obstacles it may meet with while operating to form the furrow. This somewhat free connection of the plow coacts with the stirrup and link connections at the end of the beam to cause the plow to readily adjust itself to the conditions that it meets with while cutting the furrow and yet maintaining itself substantially in its proper relation with respect to the tractor.

We claim:—

1. In a tractor plow, a plow having a plow beam, a link connecting the end of the beam of the plow with the frame of the tractor, springs extending laterally from opposite sides of the beam of the plow for yieldingly holding the beam of the plow in its position with reference to the frame of the tractor, a means connected to the plow at a point substantially over the center of gravity of the plow for lifting the plow and allowing lateral play of the plow against the tension of the laterally extending springs.

2. In a tractor plow, a plow having a plow beam, a cross bar, a link for connecting the end of the plow beam to the cross bar, a T-arm connected to the end of the plow beam, laterally extending springs connected to the ends of the head of the T-arm and to the frame of the tractor for yieldingly holding the end of the plow beam in position with reference to the frame of the tractor, a means connected to the plow beam at a point substantially over the center of gravity of the plow, and allowing lateral play of the plow against the tension of the laterally extending springs.

In testimony whereof we have hereunto signed our names to this specification.

OTTO L. PLETTNER.
    WILLIAM H. LOWE.